United States Patent [19]

Pietzsch et al.

[11] Patent Number: 4,640,775
[45] Date of Patent: Feb. 3, 1987

[54] VACUUM FILTER FOR THE SEPARATION OF SOLIDS FROM LIQUIDS

[75] Inventors: Kurt E. Pietzsch, Wiesbaden-Sonnenberg, Fed. Rep. of Germany; Laszlo Bonnyay, JV-Wassennar, Netherlands

[73] Assignee: Dorr-Oliver Incorporated, Stamford, Conn.

[21] Appl. No.: 687,805

[22] Filed: Dec. 31, 1984

[30] Foreign Application Priority Data

Feb. 7, 1984 [DE] Fed. Rep. of Germany ....... 3404110

[51] Int. Cl.⁴ .............................................. B01D 33/32
[52] U.S. Cl. .................................... 210/387; 210/401; 210/416.1
[58] Field of Search ............... 210/401, 400, 387, 328, 210/326, 416.1; 198/811

[56] References Cited

U.S. PATENT DOCUMENTS

| | | |
|---|---|---|
| 1,862,050 | 6/1932 | Donaldson .......................... 210/400 |
| 2,094,350 | 9/1937 | Cartigny ............................. 210/401 |
| 2,873,028 | 2/1959 | Bried ................................... 210/401 |
| 2,963,161 | 12/1960 | Holland ............................... 210/401 |
| 3,105,817 | 10/1963 | Seibert ................................. 210/401 |
| 3,477,583 | 11/1969 | Krynski et al. ..................... 210/401 |
| 3,513,974 | 5/1970 | Markwick ....................... 210/328 X |
| 4,154,686 | 5/1979 | Ootani et al. ....................... 210/328 |
| 4,265,765 | 5/1981 | Gallottini et al. .................. 210/401 |
| 4,338,193 | 7/1982 | Lautrette et al. ................... 210/401 |
| 4,483,770 | 11/1984 | Casey et al. ........................ 210/401 |

Primary Examiner—Richard L. Chiesa
Attorney, Agent, or Firm—Burtsell J. Kearns; Gary R. Plotecher; Larry W. Evans

[57] ABSTRACT

A horizontal vacuum tray filter having a plurality of U-shaped trays interconnected to a conveyor for movement past a filtration zone in the horizontal plane of movement wherein an endless filter cloth is disposed over the bottom walls of the trays in said horizontal plane with the adjacent open ends of said trays in detachable sealing engagement to provide a continuous filtration surface over the filtration zone.

8 Claims, 7 Drawing Figures

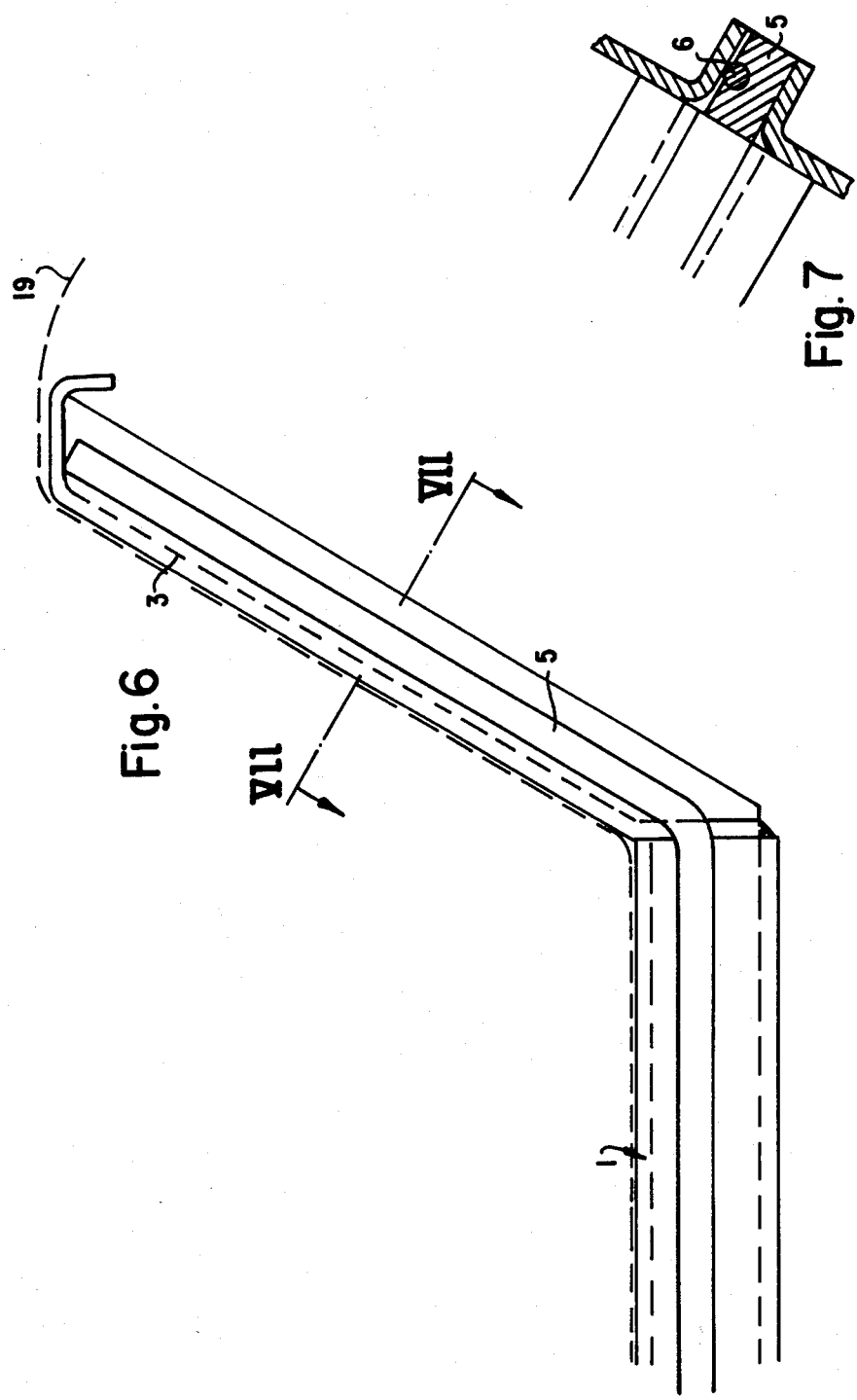

VACUUM FILTER FOR THE SEPARATION OF SOLIDS FROM LIQUIDS

BACKGROUND OF THE INVENTION

The present invention is directed to new and useful improvements in vacuum filters for separating solids from liquids and in particular to a horizontal tray filter that is provided with an elastic belt rotated in a longitudinal direction about spaced wheel members. The belt is provided with an endless row of trays fixed thereto which glide on a stationary vacuum channel formed in a horizontal filtration zone.

Horizontal tray vacuum filters are well known and with the horizontal arrangement of the filtration zone offer excellent filtration for many applications wherein the forming of the filter cake is supported by gravitation and wherein the cake washing can be carried out most efficiently. Certain horizontal filters are provided with a rotating disc or pans about the filter area which are separately divided pans which are tiltable for the cake discharge. There are other such machines known as reciprocating pan filters or intermittent belt filters which have the disadvantage of not being capable to carry out continuous filtration operation when the filter cloth is moved against the pan or vice versa and the vacuum is interrupted. The intermittent filtration which results limits the field of application for these filters especially if rapid filtering of slurry materials is desired. Furthermore the washing of the filter cake in these known machines is less efficient, complicated and difficult control systems are necessary for the operation of the filter.

In one such type filter shown in U.S. Pat. No. 1,862,050 to Donaldson a vacuum filter is shown wherein a pan filter is provided with trays that are rotatable on a conveyer with the filter cloth caulked into each single pan with a closed rim about the pan. In the latter type pan filter which is movable in a horizontal plane a number of separate pans are arranged like a conveyer with each pan having an individual connection to a lower vacuum filtrate channel whereby a gliding seal is effected between the pans and the vacuum channel. This type of filter has the disadvantage of being of a complex mechanical design. Further the cake cannot be discharged completely nor the filter cloth washed efficiently.

It is also already known in horizontal vacuum filters to provide an endless filter cloth over the filtration zone on the principle of a conveyer belt. These filters usually provide heavy endless rubber belts for example with a width of 1 m up to 6 m for supporting an endless filter cloth. The rubber belt is designed in such a way that it forms a gliding sealing with a vacuum filtrate channel in the filtration zone. These known rubber belt filters have the disadvantage of being heavy and difficult to handle and assemble and are extremely expensive. If the rubber belt is to be changed due to abrasion after a period of use this machine must be completely disassembled. Moreover, the applications for this kind of filter are limited as there are certain liquids in suspensions which may not be brought into contact with the rubber belt. It is possible, however, with these known rubber belt filters to lead the filter cloth by a belt onto the filter area at the inlet and outlet to the machine so that outside of the filtration zone washing devices are also available for the routine cleaning of the filter cloth. The disadvantage of these known rubber belt filters are the generally difficult assembly procedures, heavy weight of the massive rubber belt, and the considerable investment cost.

It is the object of the present invention to provide a novel horizontal pan or tray type vacuum belt wherein the filter cloth can be cleaned while the filter is in operation with a minimum of difficulty. To accomplish this objective an endless filter cloth is provided about the trays above the filtration zone and with the washing devices located outside the filtration zone and in a manner whereby each adjacent tray has a sealing engagement in the front and rear thereof with the next adjacent tray with each tray formed without rims so that the row of adjoining trays form one filter area. Further, all trays are linked with an elastic endless belt which is connected with the vacuum channel over openings with discharge of filtrate with the endless belt led in a gliding way on the vacuum channel. The trays supporting the endless filter belt are open on the two sides and fringeless whereby the assembled trays in a horizontal position form one single large filtration area. Each tray has its own connection with the vacuum channel underneath and is assembled in such a way that the tray and vacuum channel form together a gliding seal.

The above and other objects and advantages of the present invention will appear more fully hereinafter from a consideration of the detailed description which follows taken together with the accompanying drawings wherein one embodiment of the invention is illustrated.

DESCRIPTION OF THE DRAWINGS

In the Drawings:

FIG. 6 is an enlarged view of a tray fringe; and

FIG. 7 is a sectional view along line VII—VII of FIG. 6.

DETAILED DESCRIPTION

Figure 1:
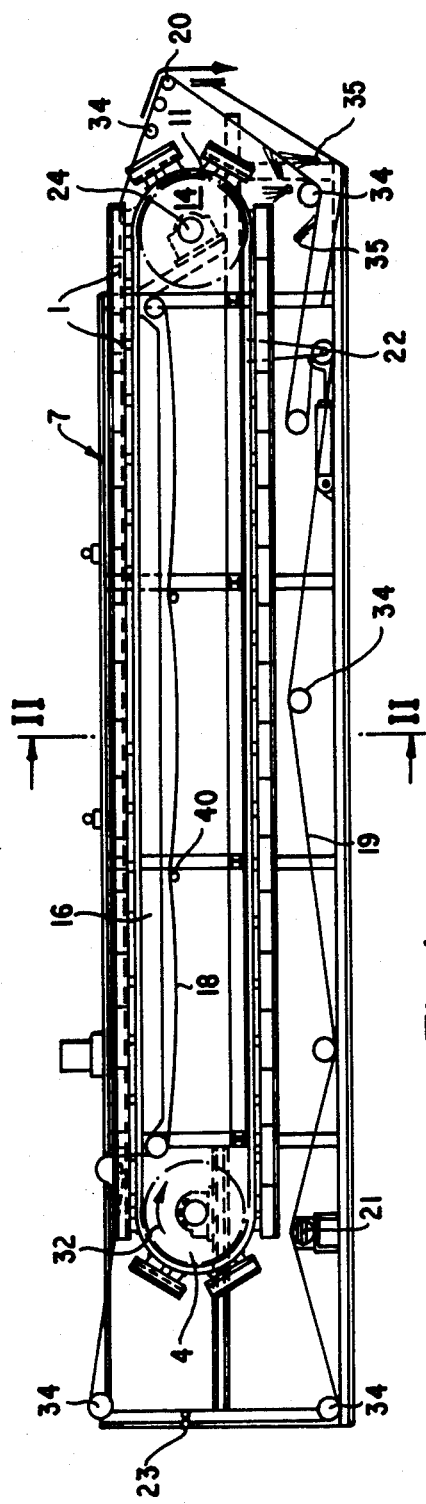
FIG. 1 is a schematic side elevational view of vacuum filter made according to the present invention and shows the horizontal filter areas formed by the row of trays being arranged one after the other.
Figure 2:
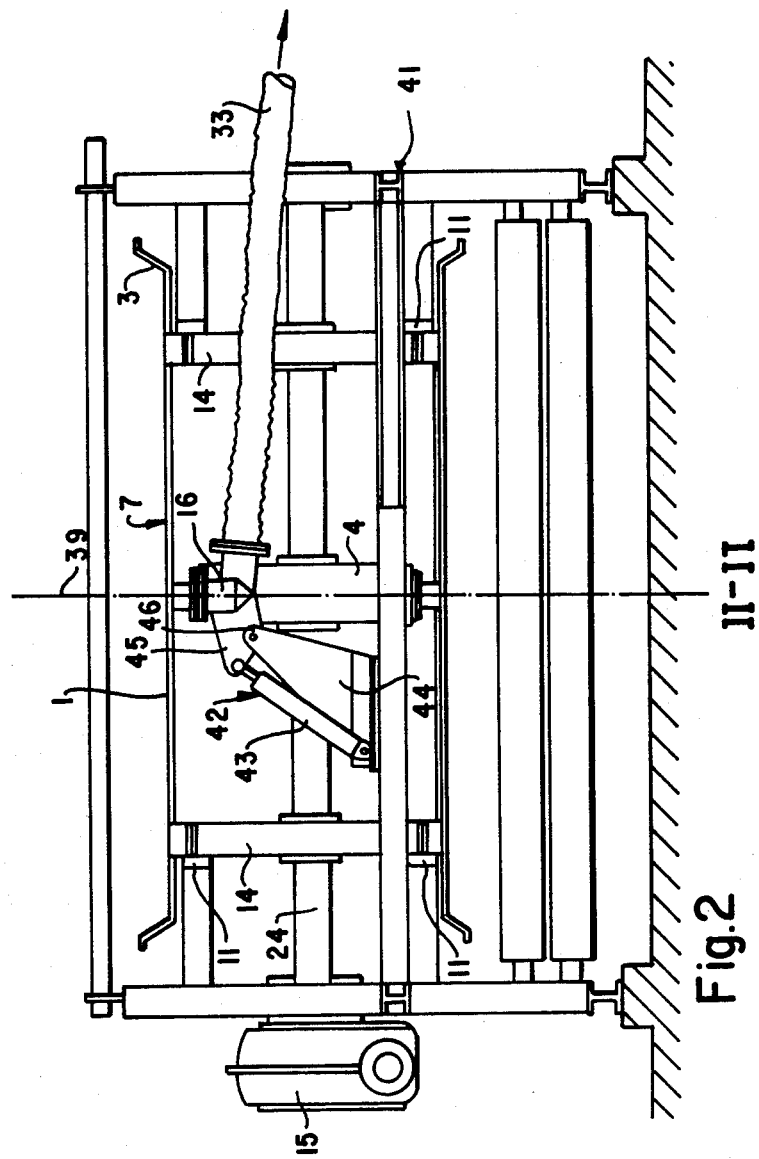
FIG. 2 is a sectional view taken on the line II—II in FIG. 1.

Referring now to the drawings for a more detailed description of the present invention. A vacuum filter is seen in FIGS. 1 and 2 and is provided with pulleys 4 and teethed pulleys 14 arranged in longitudinal spaced positions whereby only the teeth pulleys 14 are for drive and wherein the pulleys 4 are driven. In comparing FIG. 2 with FIG. 1 it can be seen that in direction of movement of a plurality of U-shaped trays 1, two teeth pulleys 14 are used and are laterally spaced distance one from the other. Pulleys 14 are fixed on the drive shaft 24 of a motor 15 which may be a Thyristor motor 15 provided with a suitable worm gear.

Figure 3:
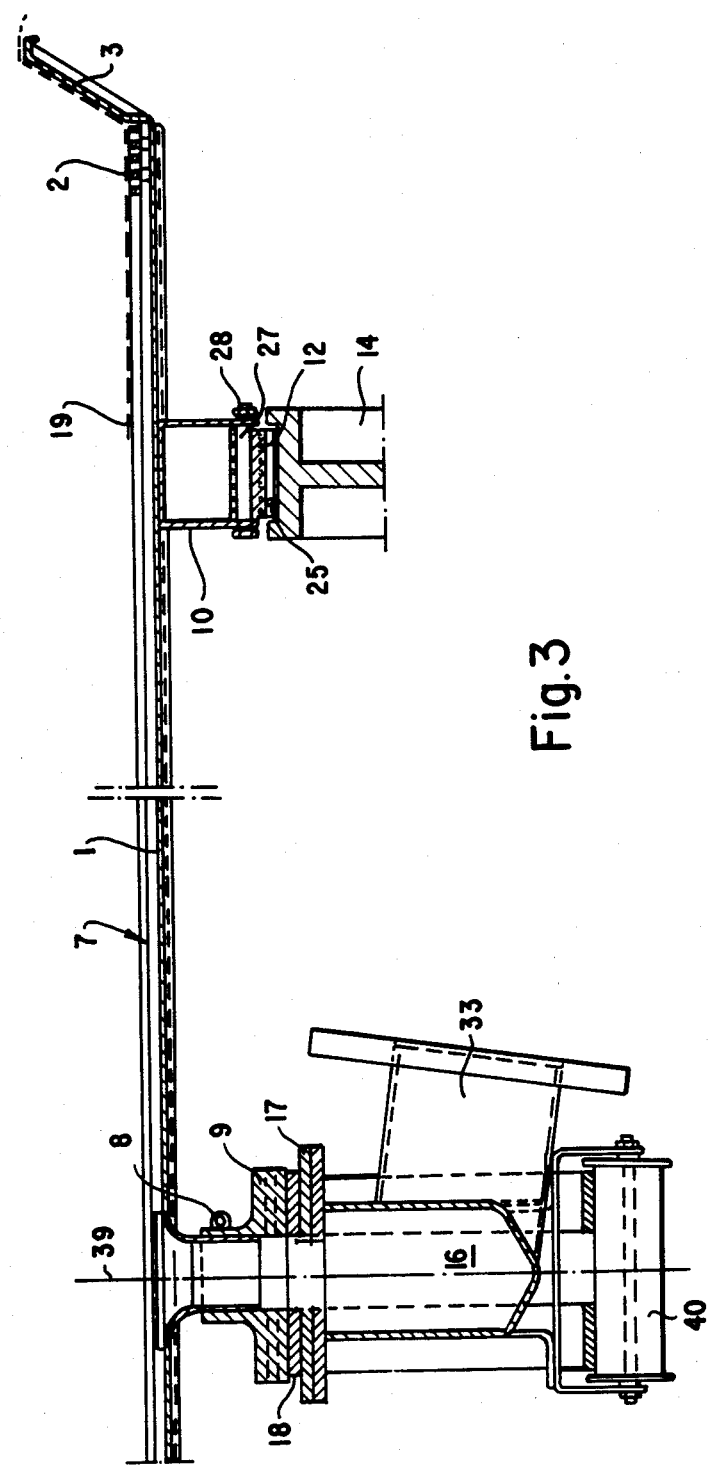
FIG. 3 is an enlarged view of a portion of FIG. 2 showing the middle and right part of a tray with mounting support and discharge running in the direction of the paper plane surface and showing the trays with connections in filtrate discharge.

Teeth pulleys 14 (one of which is shown in section in FIG. 3) comb via teeth with counterteeth 25 of a rubber conveyer chain 12 which is reinforced with wires 26 and bolts 27 and locked by nuts 28. Chain 12 is fixed on a cam 10 fastened at the undersurface of each tray 1. This connection is seen in FIG. 3 on the right whereas in FIG. 2 it is shown having a dual connection with a tray 1. In order to move trays 1 cam 10 is provided with a hole 29 located in the middle thereof for accepting a bolt 27 of chain 12.

Figure 4:
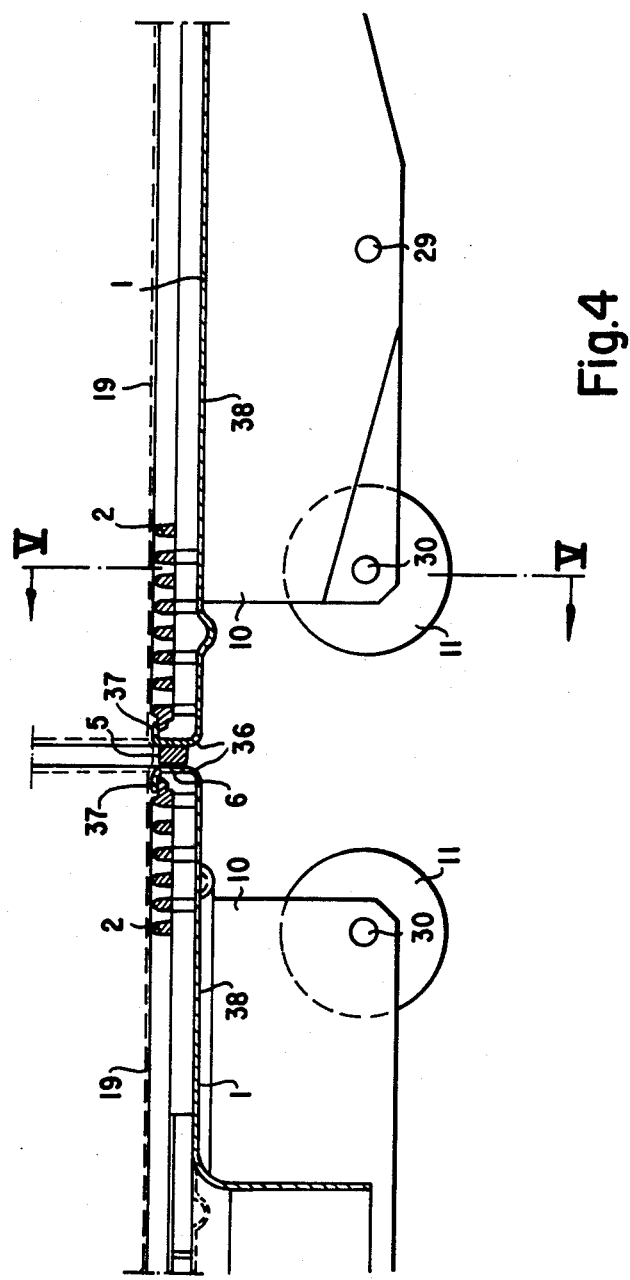
FIG. 4 is a longitudinal view in the direction of rotation of the trays showing the sealing engagement of two adjacent trays.
Figure 5:
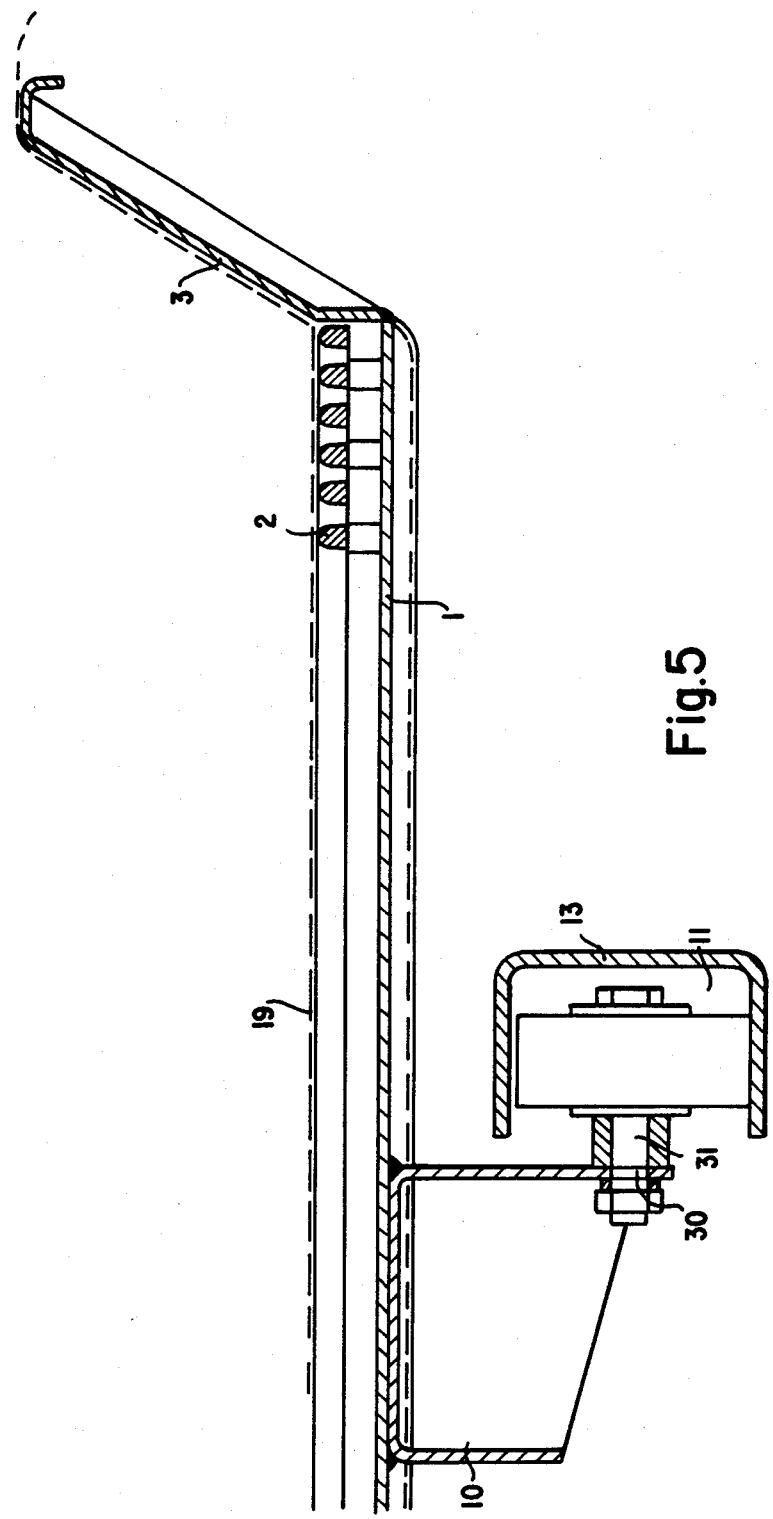
FIG. 5 is a sectional view along the line V—V of FIG. 4.

An additional hole 30 (FIGS. 4-5) is provided in the direction of movement of cam 10 for shaft 31 of guide pulley 11. Guide pulley 11 (FIG. 5) is shown in a moved position in a guide reel 13. For simplification, guide reels 13 are omitted in FIGS. 1 and 2 however it can be seen that each tray 1 is led on both sides in a longitudinal direction over cam 10 which is welded to the bottom of tray 1 by supporting of the guide pulleys 11 in guide reels 13. Both sides of chains 12 are fixed to cams 10 between the two guiding pulleys.

The direction of rotation 32 of the vacuum filter is shown in FIG. 1 by the bent arrow in a clockwise direction. In rotation rubber chain 12 is moved with the endless row of movably fixed trays 1. The trays form a continuous filter area or deck 7. As in known filters a stationary vacuum channel 16 is arranged in a longitudinally extending direction beneath the row of trays 1 in gliding contact with the respective bottom sides of the trays, as clearly shown in FIG. 3 with a suitable filtrate outlet 33 provided.

A band shaped endless filter cloth 19 is fed over various rolls 34 with the wrinkling of filter cloth 19 avoided by tracking roll 21, a guide roll 22 and a tensioning system 23. A cake discharge roll 20 is provided although any preferred type of discharge system for the filter cake may be provided. The endless filter belt 19 is led over the whole surface of grids 2 (FIGS. 4 and 5) provided in trays 1 and moved simultaneously therewith.

It is to be understood that the filtration zone in the area over the vacuum channel 16 broadens laterally in the row of trays 1. Washing devices 35 are shown as water spray nozzles in FIG. 1 on the right hand side and are located outside the filtration zone.

As mentioned it is an object of the present invention to provide novel arrangement of trays 1. To this end each tray 1 is provided without a rim in the direction of movement of the respected trays 1. As clearly seen in FIG. 4 both end edges 36 of adjoining trays are maintained in sealing arrangement by adjoining elastic sealing strips 5 which are provided with reinforcing wires 6.

In FIGS. 2, 3, 5 and 6 it can be seen that in the direction of movement the engagement of adjacent side walls of trays 1 function as a dam 3 and with the front and rear ends of the trays 1 abutting each other from a single uniform and continuous filter area 7. In addition grids 2 are provided which form a supporting area for the filter cloth 19. Each grid 2 is formed with downwardly extending feet to allow for the snapping engagement of a cap strip 37 (FIG. 4) which may be easily removed or mounted. Cap strips 37 are arranged at both the front and rear end rim 36 of the lower part 38 of each tray 1. This front or back rim 36 can also be called a sealing rim.

In FIG. 3 each tray 1 has a filtrate outlet nozzle which is connected with a rubber belt 9 by a clamp 8 near the center line 39 of the bottom of tray 1. Belt 9 is led as a rotating conveyor and glides over two endless wear belts 18 arranged parallel to each other on the gliding surface 17 of the vacuum channel 16. The latter gliding surface is preferably furnished with additional polytetrafluorethylene bars. In the lower part the wear belt 18 rests on supporting rolls 40 which are fixed to other parts of the filter frame generally marked 41. The polytetrafluorethylene surface 17 reduces considerably the wear on belt 9 and is readily and inexpensively interchanged when desired.

If the wear belt and possibly also the rotating rubber belt 9 are to be removed for cleaning purposes especially to clean vacuum channel 16 the complete unit of channel 16 and wear belt 18 can be swung outwardly after loosening clamp 8 with the nozzle at rubber belt 9 by the swinging device 42 shown in FIG. 2. Swinging device 42 consists of a hydraulic cylinder 43 fixed to a stationary metal sheet 44 and a swinging plate 45. By touching a swinging plate 45 the latter swings together with the vacuum channel 16 about the point of rotation 46 downwardly. The swinging device can also be furnished with a counterweight that can be operated manually.

As will be appreciated by those skilled in the art the present invention has many advantages in use. The wear belts 18 are movably arranged in a filtration zone underneath the elastic endless belt 9 and over the gliding surface of the stationary vacuum channel on both sides of the endless belt. The belts can be easily exchanged, replaced or removed for cleaning purposes. The wear belts 18 and also the elastic endless belts are considerably smaller and have less weight than known rubber belts for similar filters which form the filter area. The width, thickness and assembly of the elastic endless belt according to the present invention represents only a fraction of this massive and heavy rubber belts of known machines.

A further advantage is in the cleaning of the vacuum channels and adjacent elements or exchanging of wear belts wherein the vacuum channel is swingably fixed at the frame. The vacuum channel can be lowered or swung out of its operational position without taking off the filter cloth and/or the trays. Thus the required cleaning, maintenance or repair can be carried out easily.

A further advantage is that the grid may be made preferably of plastic and possesses apart from a good compatability with other manufactured materials a sufficient stiffness but also an adequate flexibility. This makes it possible that front and back ends of the grids can be snapped underneath the cap strips in the direction of movement of the trays. The cap strips are preferably foreseen as fixed to the lower part of each tray, thus repair and maintenance can be carried out quickly and easily without risking stoppage of the vacuum filter.

Although one embodiment of the present invention has been illustrated and described in detail it is to be expressly understood that the invention is not limited thereto. Various changes can be made in design arrangement of parts without departing from the spirit and scope of the invention as the same will now be understood by those skilled in the art.

What is claimed is:
1. A vacuum tray filter for separating solids from a liquid slurry comprising, an endless conveyor belt rotatble about a pair of longitudinally spaced wheels mounted on a main frame structure, said conveyor belt movable in a horizontal plane of travel located between said spaced wheels and defined by the distance therebetween, an endless row of U-shaped trays fixed to said conveyor belt for movement in said defined horizontal plane of travel, slurry feed means located at the tray entry to said horizontal plane, a filtration zone in said horizontal plane of travel arranged after said feed means, a stationary vacuum channel in said filtration zone, each of said U-shaped trays having a bottom wall and spaced sidewalls extending upwardly and away from said conveyor belt, each tray having a sealing engagement at the front and rear edges of said sidewalls and bottom walls thereof with the correpsonding edges of the sidewalls and bottom walls of the next adjacent trays throughout movement of said engaged trays through said defined horizontal plane, an endless filter cloth lying between the said sidewalls of said engaged trays and disposed about the said engaged bottom walls of said trays along the entire length of said horizontal plane of travel, and said trays connected to said conveyor belt for gliding movement over said vacuum channel.

2. The filter of claim 1 wherein said conveyor belt is an endless rubber chain.

3. The filter of claim 1 wherein washing devices are provided for said filter outside of said filtration zone.

4. The filter of claim 1 wherein sealing means are provided on said bottom and sidewall tray edges and comprise an elastic sealing tape affixed to edges having a reinforcing wire contained therein.

5. The vacuum filter of claim 1 wherein a wear belt is provided in said filtration zone beneath said endless belt for engaging a sliding surface of said stationary vacuum channel at opposite sides of drainage holes provided in said endless belt.

6. The vacuum filter of claim 1 wherein said vacuum channel is mounted for pivotable movement towards and away from the filter frame structure.

7. The vacuum filter of claim 1 wherein each tray is provided with a removable filter grid beneath said filter cloth.

8. The filter of claim 7 wherein clamp means are provided for detachably detenting said grid to said tray surface.

* * * * *